Blair, Buckles & Cesari
ATTORNEYS

Dec. 10, 1968 E. D. DE CASTRO 3,416,141

DATA HANDLING SYSTEM

Filed June 7, 1966 5 Sheets-Sheet 2

United States Patent Office 3,416,141
Patented Dec. 10, 1968

3,416,141

DATA HANDLING SYSTEM

Edson D. de Castro, Newton Highlands, Mass., assignor to Digital Equipment Corporation, Maynard, Mass.

Filed June 7, 1966, Ser. No. 555,754
9 Claims. (Cl. 340—172.5)

The present invention relates to electronic data handling systems. More particularly, it relates to a system for efficiently handling data flow to and from a plurality of individual data stations. Specifically, the system of the present invention is adapted to assemble data randomly received from the individual data stations. It includes a memory unit to store received data typically for eventual retransmission at a faster data rate to a central data station, which may take the form of a large computer. Moreover, it is adapted to transmit stored data back to appropriate ones of the individual data stations at an acceptable data rate, typically equal to the rate at which the individual data stations transmit data. This retransmitted data would typically originate at the central data station.

The invention is disclosed in connection with its application to the handling of teletypewriter data. It should be understood that it is not particularly limited to the character of the individual data stations as long as the data transmissions take the form of a succession of data characters coded in serial binary bit format.

There are many factors to consider when attempting to handle data transmissions over a plurality of teletypewriter lines. On any one line, the binary bits of a teletypewriter character arrive at regular intervals, but the characters themselves do not. That is, the time intervals between the transmission of successive data characters making up teletypewriter message typically vary considerably. Upon completion of a message transmission, the line may remain inactive for relatively long periods of time. If transmissions over the various teletypewriter lines occur randomly, then some of the input lines may be active at the same time. It will be appreciated that to handle data transmission from plural sources other than randomly would require considerably more equipment and would be quite inefficient in view of the high data rate capabilities of modern data handling equipment. Thus, handling the data transmission on a random basis requires that means be provided to register all transmitted teletypewriter bits as they arrive over the various teletypewriter lines, otherwise some of them will be lost. Moreover, the teletypewriter bits received over the various lines must be kept segregated if the integrity of the teletypewriter characters and messages is to be preserved.

Using a full duplex arrangement between each teletypewriter station and the data handling equipment to accommodate concurrent bidirectional flow of teletypewriter data, the equipment must additionally have the capability of transmitting data back to each station. Typically, such data transmission to the individual teletypewriter stations can be carried out on a programmed basis. However, the data rate of such transmissions must be significantly slower than the normal rate at which the data handling equipment is capable of operating. Thus, the high operating speeds of the data handling equipment must be rendered compatible to the relatively slow response capabilities of conventional teletypewriter receivers. Moreover, the data handling equipment must operate to transmit the various teletypewriter data to designated ones of the individual teletypewriter stations. It will also be appreciated that the handling of incoming data must take precedence over the transmission of data to the individual stations, otherwise incoming data will be lost and, once lost, cannot be recovered.

Heretofore, prior data handling systems operating to accept data transmissions on a random basis from plural data stations have typically provided shiftable input registers connected to each of the incoming lines. Thus, each input register handles data transmission over only the lines to which it is connected. The bits of a Teletype character, transmitted at a suitable teletypewriter baud rate, are shifted into the input registers as received. When a register is filled, i.e., contains a complete character, its contents are rapidly transferred to determined locations in a larger memory unit. Then at selected times, such as after a complete message consisting of a plurality of characters has been received over a particular line and stored in the memory unit, the contents of specified memory locations are transferred at a rapid rate to a central station such as a large computer.

It will be appreciated that "on line" input registers assigned to each incoming line eliminate the problem of concurrently active lines, yet they involve considerable expense. Some of the input lines may be relatively inactive but still occupy the full time of their input registers. When considering the extremely high potential operating rates of such input registers relative to the baud rate of the incoming teletypewriter data, the impracticality of these prior art arrangements becomes quite obvious.

To provide for data transmission back to the individual teletypewriter stations, prior art data handling systems have typically employed separate equipment to perform this function. Thus, such systems include equipment devoted exclusively to handling data received from the plural individual stations and other equipment devoted exclusively to transmitting data back to the individual stations. As a result, systems accommodating bidirectional data flow have proven to be unduly elaborate, complex, and expensive.

Accordingly, it is an object of the present invention to provide a system for efficiently handling data flow to and from plural data stations.

An additional object is to provide a system of the above character which is capable of accepting data transmissions on a random basis.

A further object is to provide a system of the character requiring far fewer components than prior systems used for the same purpose.

Another object is to provide a system of the above character wherein its component parts are employed in economical and efficient fashion.

Yet another object is to provide a system of the above character wherein the data received from the various data stations, as well as the data to be transmitted back to the various data stations, is, for most part, handled by common data processing equipment.

A still further object is to provide a system of the above character which is simple in design, inexpensive, and reliable.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which.

Figure 1:
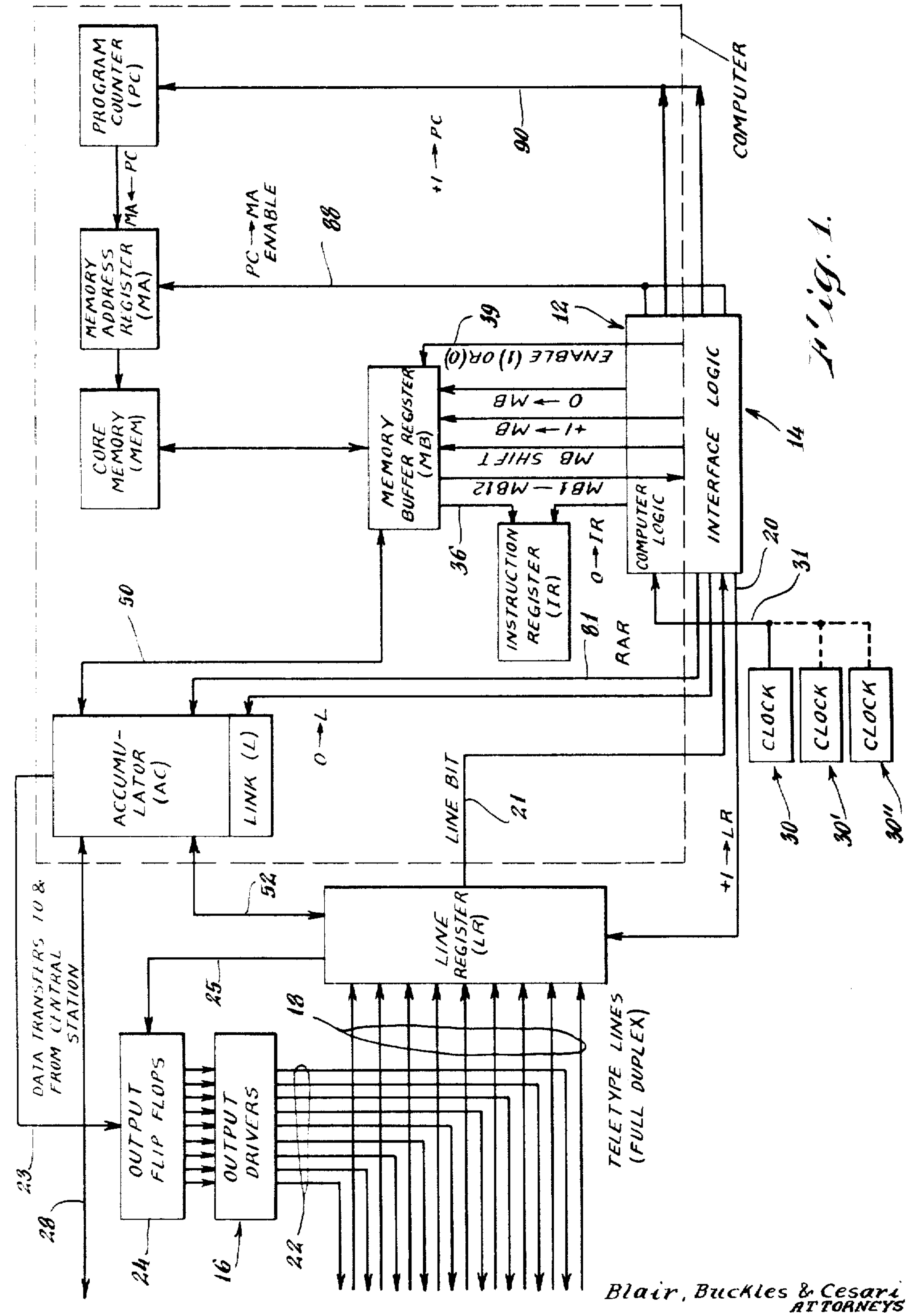
FIGURE 1 is an overall block diagram of an embodiment of the present invention.
Figure 3C:
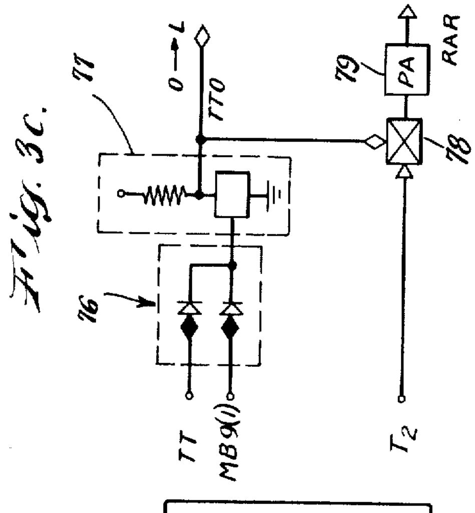
Figure 3D:
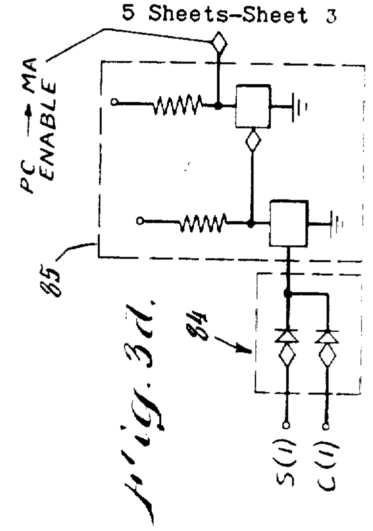
Figure 3B:
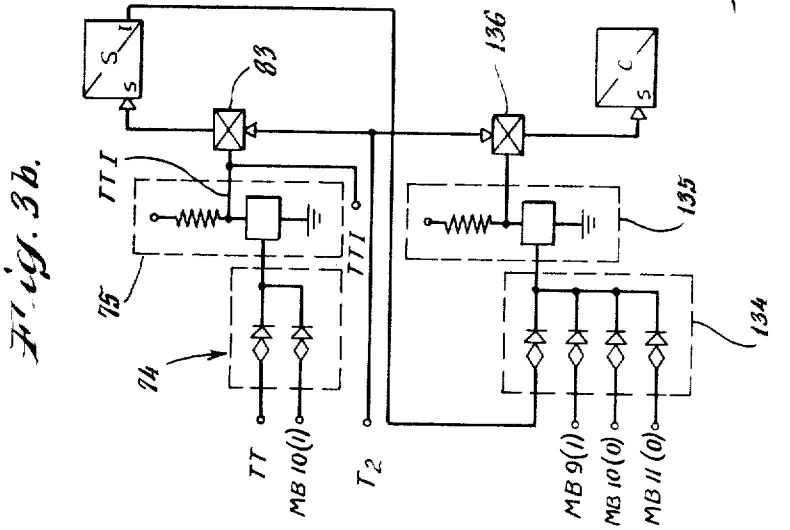
Figure 3A:
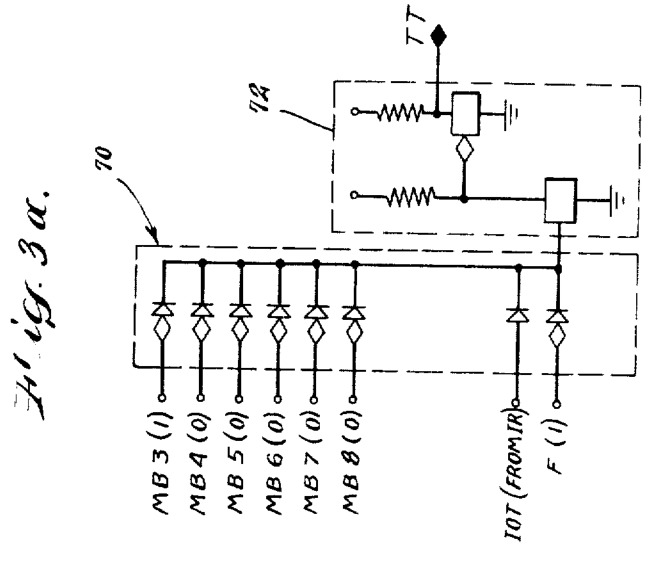
Figures 3E, 3F, 3G:
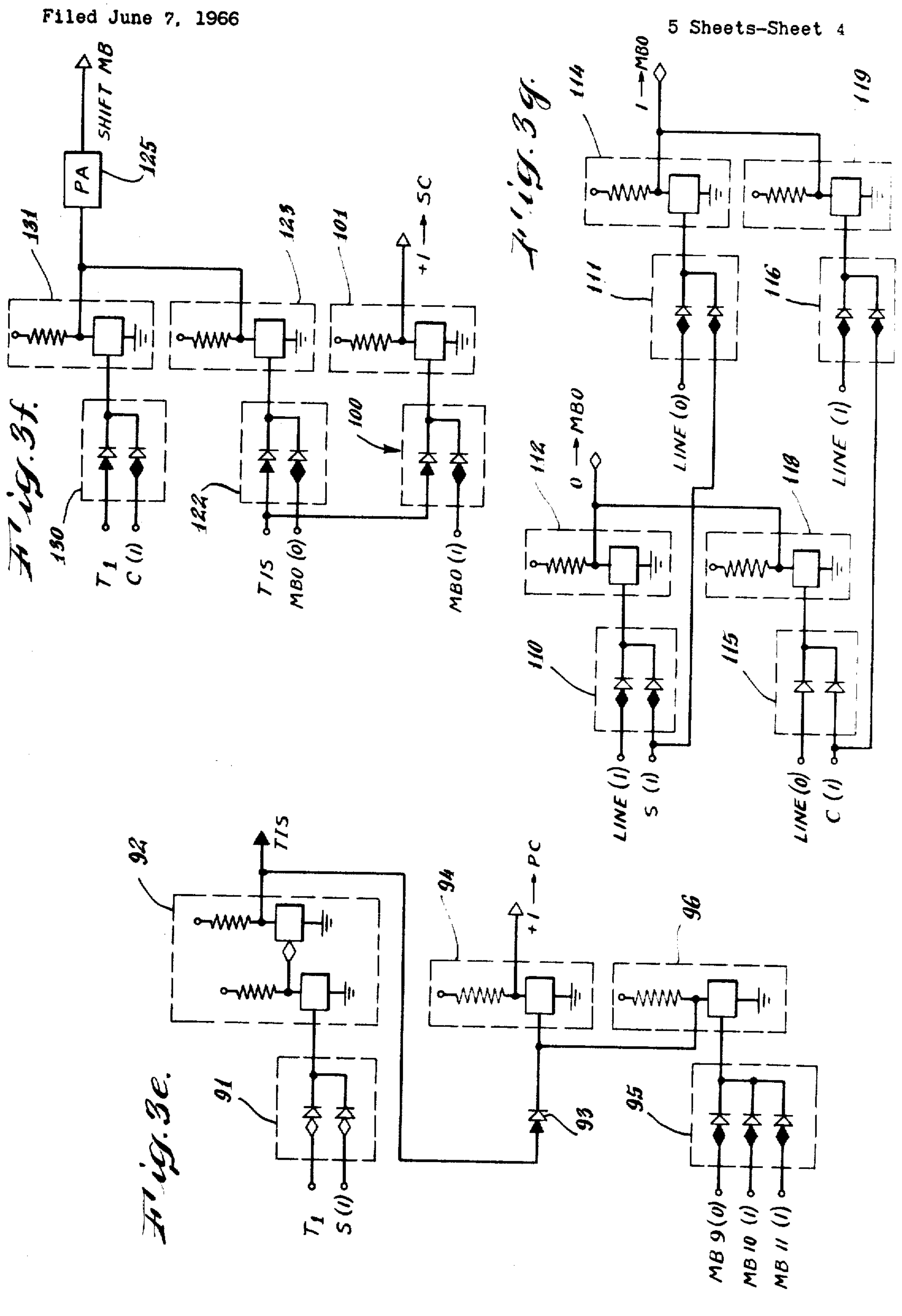
Figure 4:
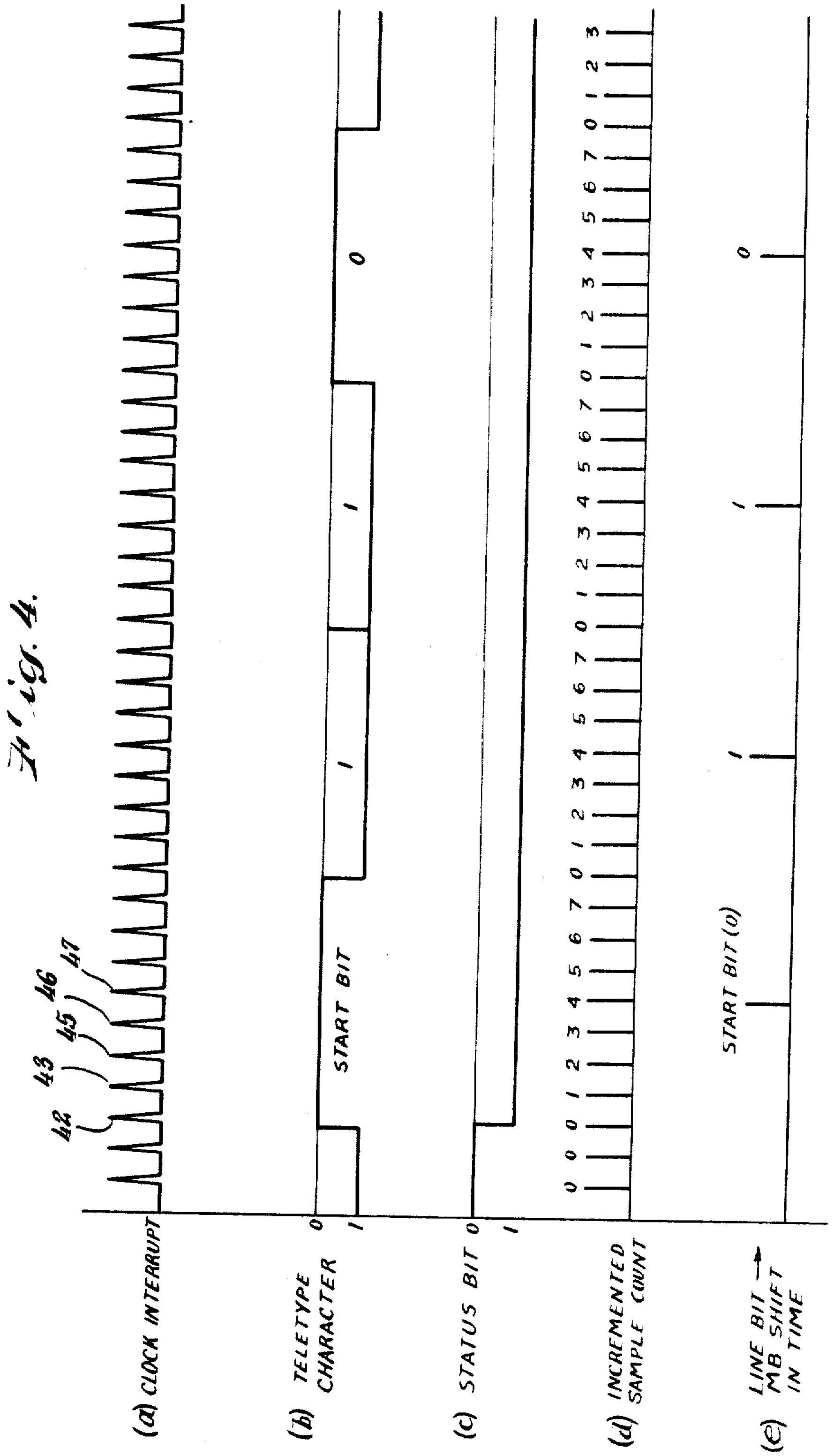

FIGURES 3*a*–3*g* are more detailed schematic diagrams of various control circuits employed in the system of FIGURE 1; and FIGURE 4 is a timing diagram relating the operation of the system of FIGURE 1 to the arrival of binary bits making up a teletypewriter character.

Considering generally the handling of incoming teletypewriter characters by the invention, the teletypewriter lines over which these characters arrive are connected from the individual teletypewriter stations to a multiple position switch herein termed a "line register." The line register is indexed to effectively connect each input teletypewriter line to a memory buffer register in repeating sequence. The time required for the line register to index through all of the input teletypewriter lines is significantly less than the pulse interval of a teletypewriter bit transmitted on any one line. Each input line is sampled for the presence of a teletypewriter bit during the time it is selected by the line register. If a teletypewriter bit is present and certain conditions to be described are met, the bit is entered into the memory buffer for inclusion with a character assembly "word" held therein. From the memory buffer the character assembly word is transferred to the memory for storage in a location assigned to the particular input line over which the bit is being transmitted. This process is repeated for each input line, in sequence.

The time interval between consecutive samplings of any one input line is less than the pulse interval of a teletypewriter bit transmitted on that line. Thus, no teletypewriter bits are lost in spite of the random nature of the teletypewriter transmissions from the various individual teletypewriter stations. In the specific disclosed embodiment of the invention, each input line is sampled at a rate equal to eight times the baud rate of the transmitted teletypewriter data. That is, all input lines are sampled eight times in the time taken to transmit one teletypewriter bit of character at the adopted baud rate.

During the sampling of a particular teletypewriter input line, the character assembly word assigned to that line is transferred from the memory into the memory buffer. Thus, all previously received teletypewriter bits that are parts of a character coming in over this line are held in the memory buffer register each time this line is sampled. If a teletypewriter bit is being transmitted over this line during the sampling interval, it is entered into the memory buffer register in corrected positional relationship with the previously received teletypewriter bits making up the character assembly word. The character assembly word is then returned to its assigned location in the memory. When all of the bits of a teletypewriter character transmitted over a particular input line have been assembled, they may be transferred to a new memory location also assigned to that input line. The character assembly location in the memory is then cleared and ready to accept and assemble bits of the next teletypewriter character to be transmitted over this teletypewriter line.

When a complete message consisting of a plurality of characters has been received over an input line, the system, if suitably programmed, will transfer it at a rapid rate to a central station, which may take the form of a large computer. These transfers are made at such times as the system is not occupied with the sampling of the input lines.

The teletypewriter data to be transmitted back to the various individual stations is also stored in the memory at locations assigned to the particular teletypewriter stations which are designated to receive such transmissions. Each teletypewriter character to be transmitted is transferred in sequence from the memory to an accumulator from which the individual bits of the characters are supplied to output driver circuitry connected to teletypewriter output lines leading to the individual teletypewriter stations. The data rate of these transmissions is, of course, at a suitable teletypewriter baud rate, preferably the baud rate of the data transmissions originating at the teletypewriter stations.

In order not to interfere with the sampling of teletypewriter input lines for incoming data, the system is programmed to transmit data to the teletypewriter stations only during the intervals between sampling sequences. During such an interval, a character to be transmitted over a particular output line is transferred from the memory to the accumulator. One bit of the teletypewriter character is supplied to the output driver circuitry for transmission. The remainder of the character is returned to the memory.

The next character in the sequence to be transmitted is then transferred from the memory to the accumulator. Again, only one bit of this character is supplied to the output driver circuitry for transmission, and the remainder of the character is returned to the memory. Not all teletypewriter output lines are selected for the transmission of character bits during each interval between sampling sequences. The number of teletypewriter output lines selected during each time interval between sampling sequences is equal to the total number of output lines divided by the ratio of the sampling sequence rate to the teletypewriter baud rate. That is, the number of output line groups is equal to the factor by which the sampling sequence rate exceeds the teletypewriter baud rate. By way of specific example, if the sampling sequence rate is eight times baud rate, then the teletypewriter output lines are divided into eight groups with one group being selected for data transmission during each interval between sampling sequences. If there are 128 teletypewriter output lines, then there are sixteen teletypewriter lines in each group. These groups are selected in repeating sequence; thus the teletypewriter bits are transmitted over the various teletypewriter output lines at precisely the desired baud rate.

Referring now to the drawings, the essential means for implementing the invention are conveniently found in typical small-scale general-purpose computers, such as the model PDP-8 manufactured by the Digital Equipment Corporation of Maynard, Mass. Thus, the major portion of FIGURE 1 corresponds to the typical block diagram of a computer. It should be understood that the various operations of the invention in handling data do not necessarily require the use of a general purpose computer. However, a computer block diagram is disclosed in connection with the invention since a majority of the principal operating elements and controlling logic circuitry necessary to the invention are found in any computer of the above-noted type.

Referring to FIGURE 1, the accumulator AC is a 12-bit register in which the various arithmetic and logic operations of the computer are typically performed. The function of the accumulator AC, insofar as the present invention is concerned, is that of an input-output register handling data transfers to and from external devices, to wit, to the individual teletypewriter stations, and to and from the central station. The link L is a one-bit register typically operating as an integral part of the accumulator AC. The core memory MEM is the main short term storage unit of the system storing coded instructions and data. The memory buffer register MB, a 12-bit register, handles all word transfers to and from the core memory MEM.

The instruction register IR contains the operation code of the instruction currently being performed by the computer. The program counter PC is a register which contains the address of the core memory location from which the next word is to be transferred to the buffer register MB. The address in the program counter PC is transferred into the memory address register MA, which functions to address the core memory MEM. Computer logic circuitry, generally indicated at 12, controls the various operations of the above-noted registers in accordance with a system program.

Among those elements of FIGURE 1 necessary to the invention but typically not found in a computer are a line register LR, interface logic, generally indicated at 14 and output drivers, generally indicated at 16. The line register LR is essentially a multi-position switch having as inputs the plural teletypewriter input lines, commonly indicated at 18. The line register may take the form of a gating network controlled by an electronic counter incremented by signals ($+1 \rightarrow LR$) fed over line 20 from the interface logic 14. Thus, the register LR connects each one of the input teletypwriter lines 18 in sequence to its output terminal connected by line 21 to the interface logic 14.

The output drivers 16 are connected to the individual teletypewriter output lines, commonly indicated at 22. The teletypewriter lines 18 and 22 thus provide a full duplex communications link between the system and the individual teletypewriter stations. The teletypewriter bits to be transmitted over the output lines 22 are supplied to the output drivers 16 by output flip-flops 24. The flip-flops 24, in turn, obtain their contents from an end stage of the accumulator AC by way of a line 23. Gates associated with the flip-flops 24 are conditioned by the line register LR over connection 25 to connect the respective flip-flops to the accumulator.

As previously noted, the accumulator AC serves as an input-output register handling data transfers between the system and external devices including the individual teletypewriter stations. In addition, the accumulator handles the transfer of data over connection 28 between the system and a central station typically taking the form of a large computer. Thus, teletypewriter messages received over the various input lines 18 and stored in the core memory MEM are eventually transferred by way of the accumulator AC and connection 28. Alternatively, these messages may be transferred directly from the memory buffer register MB or by any other convenient arrangement. Conversely, messages transferred from the central station over connection 28 for storage in the memory MEM are eventually transmitted to the individual teletypewriter stations selected ones of the teletypewriter output lines 22.

Also shown in FIGURE 1 is a system clock, generally indicated at 30. The clock 30 generates clock interrupt pulses supplied over line 31 to the computer logic circuitry 12. Each clock interrupt pulse interrupts any operations in progress and initiates a sampling sequence whereby all of the teletypewriter input lines 18 are sampled in succession for the presence of incoming teletypewriter data. After the completion of a sampling sequence, a relatively long interval of time remains before the occurrence of the next clock interrupt pulse. During this interval, the system may be programmed for the transfer of teletypewriter messages to and from the central station, and the transmission of teletypewriter character bits over teletypewriter output lines 22 to the various teletypewriter stations. After the performance of these specified functions concerned with the invention, there is normally sufficient additional time before the occurrence of the next clock interrupt pulse to allow the computer to perform other operations wholly unrelated to the invention.

Before considering in detail the operations of the system in accepting teletypewriter data transmitted randomly over input lines 18, it is pointed out that preferably a block of addresses in the memory MEM is set aside for the lines 18, with each input line being assigned three consecutive memory address locations in the block. The first of these three locations contains an instruction word indicating that a teletypewriter input command TTI is to be executed with respect to the associated input line. The command TTI means that the associated input line is to be sampled for incoming teletypewriter character bits. The next memory address location in the sequence contains a status bit-sample count word. This word has two parts, namely, (1) a status bit indicating whether a character is currently being received on the line, and (2) a sample count, operative during reception of character and providing a count of the number of sampling sequences since the last-received bit in the character was received. The next memory address location in sequence holds a character assembly word into which the character bits are inserted as received over the associated input line.

Generally, the next three consecutive memory address locations in the block contain the instruction word, status bit-sample count word, and character assembly word for the next input line 18 sampled in sequence, and so forth. As will be seen below, this conveniently enables the system to proceed through a full sampling sequence with successive increments of the program counter PC incident to addressing the memory MEM for the three-word locations of each input line in sequence.

Figure 2:
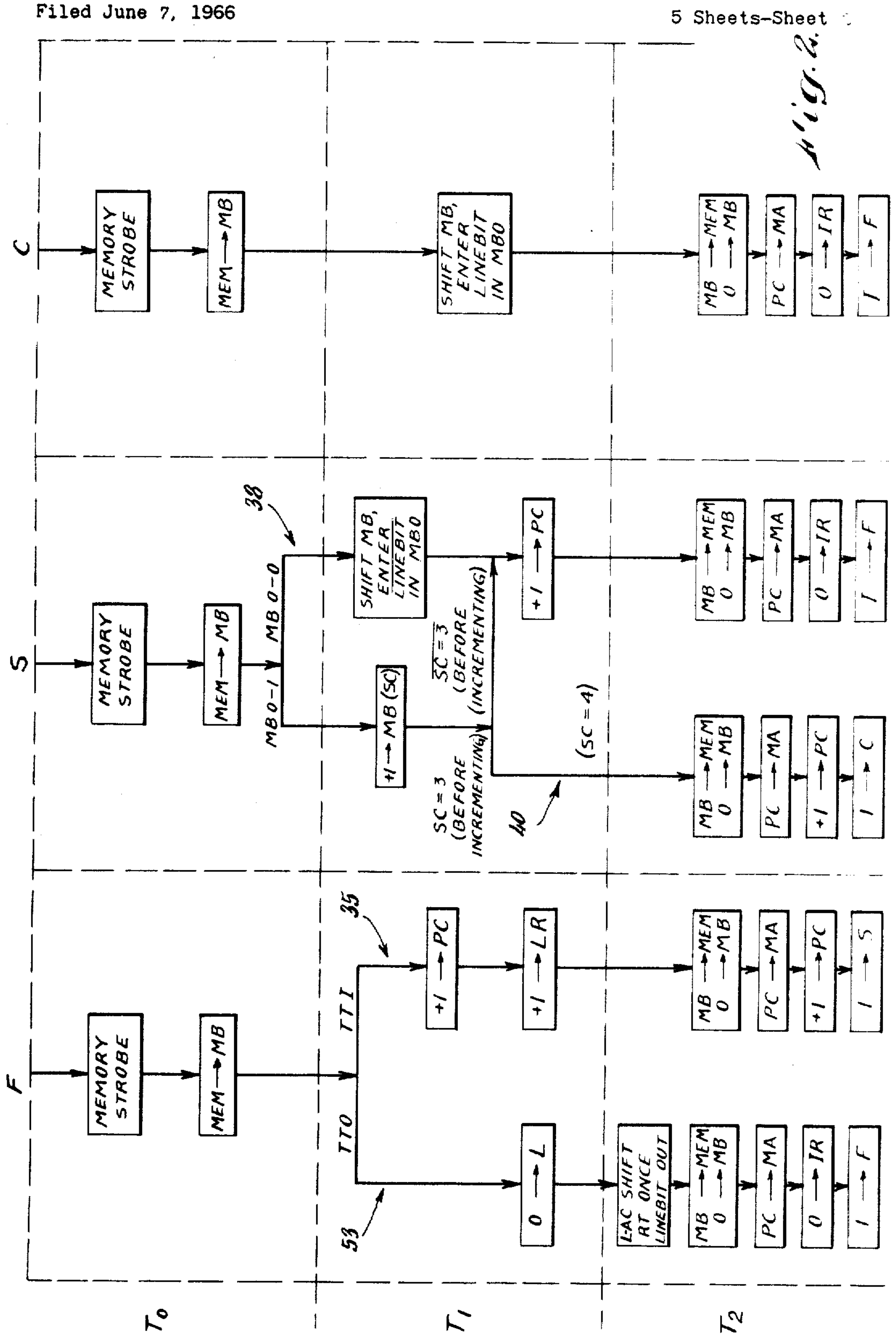
FIGURE 2 is a timing diagram showing the time relationship of various operations of the system of FIGURE 1.

FIGURE 2 shows a timing diagram or flow chart setting forth the various operations performed by the system incident to the sampling of one teletypewriter input line 18. These operations are repeated for each input line during a sampling sequence initiated by a clock interrupt pulse generated by the clock 30 of FIGURE 1. The various operations shown in FIGURE 2 are grouped into three system cycles F, S, and C. Each of these three cycles is divided into three time periods, $T_0$, $T_1$, and $T_2$ defined by a system clock in conventional synchronously operated computers. Corresponding pulses $T_0$, $T_1$, and $T_2$ are passed by various gates to perform the operations required of the system. All of the operations taking place during a cycle may be assumed to take place essentially simultaneously. However, because of delays built into the flip-flops used in the various registers, the content of a first register can be transferred to another register while changing the content of the first register. That is, the content of the first register prior to the change is transferred to the second register.

Upon the occurrence of a clock interrupt pulse from the clock 30 of FIGURE 1, any system operations in progress are interrupted and the computer responds as in a conventional interruption arrangement. It stores the contents of various registers and checks for the source of the interruption signal. It then jumps to the appropriate memory address of the interrrupting program by inserting that address into the program counter PC. With this particular interruption, the memory address to which the computer jumps is generally the first address in the memory block assigned to the teletypewriter input lines. The first few addresses in this block will ordinarily contain instructions and data relating to initiation of the teletypewriter input sequence. For example, the memory contents at these addresses may be used to set the line register LR to the number of the first input line 18 to be sampled during the following sequence.

Upon proceeding through these preliminary addresses in the memory block, the computer reaches the next address and initiates an F cycle by setting an F flip-flop (not shown). The core memory MEM is thus strobed to transfer an instruction word into the memory buffer register MB during the $T_0$ time. The instruction word, upon being decoded in the interface logic 14 (FIGURE 1) provides a teletypewriter instruction TT and a teletypewriter input command TTI during $T_1$ time of the F cycle. The command TTI causes the system to proceed through a routine indicated at 35, incident to the sampling of input line No. 1 for a transmitted character bit.

Thus, the program counter PC is incremented by one ($+1 \rightarrow PC$) during the time $T_1$ and, as a result, it then holds the address of the location in memory for the status bit-sample count word assigned to teletypewriter input line No. 1. Also during time $T_1$, the line register LR, which was previously cleared, is indexed by one ($+1 \rightarrow LR$) to connect teletypewriter input line No. 1 through to the interface logic 14 as seen in FIGURE 1.

The instruction word is returned to its assigned location in the memory MEM ($MB \rightarrow MEM$) and the memory buffer is cleared (0→MB) during $T_2$ time of routine 35 of the F cycle.

Also, the content of the program counter PC is transferred to the memory address register MA (PC→MA). Consequently, the core memory MEM is addressed to the location of the status bit/sample count word for teletypewriter input line No. 1, i.e. the second of the three memory locations assigned to line No. 1. Immediately thereafter, the program counter is incremented by one (+1→PC), thus providing the address word of the memory location for the character assembly word associated with teletypewriter input line No. 1, i.e. the third memory location assigned to line No. 1. Additionally, the system sets an S flip-flop (1→S) which conditions the system to execute the S cycle.

Still referring to FIGURE 2, the first operation executed in the S cycle is to strobe the memory MEM to transfer the status bit/sample count word into the memory buffer (MEM→MB). At this point, the system looks at the status bit held in memory buffer first or left-hand stage MB0 to determine if input line No. 1 was inactive when last sampled. It should be recalled that the status bit is a binary ONE if input line No. 1 was active or a binary ZERO if inactive when last sampled. Assuming input line No. 1 was last found to be inactive, the status bit is a binary ZERO (MB0=0) and the routine indicated at 38 is followed.

Thus, during time $T_1$, the memory buffer MB is shifted right one place, and the complement of the line bit (i.e. ZERO or ONE condition of line No. 1) supplied over connection 39 from the interface logic 14 (FIGURE 1) is shifted into the first memory buffer stage MB0. When an input line is inactive, it is clamped at a negative level corresponding to a binary ONE in the logic convention used in the particular system described herein. Accordingly, for consistency within the system, the complement of the line bit ($\overline{\text{LINE BIT}}$) is used. Thus, if the sampled input line, line No. 1 in the illustrated example, is inactive, a binary ZERO is shifted into memory buffer stage MB0 and becomes the status bit of the status bit/sample count word held in the memory buffer MB. That is, the status bit thus remains in its binary ZERO condition, indicating that input line No. 1 is still inactive.

If, on the other hand, the transmission of a teletypewriter character over input line No. 1 was initiated since last sampled, the first transmitted bit is a "start" bit, a binary ZERO, manifested by a ground potential on input line No. 1. The complement of the start bit, i.e. a binary ONE, is then shifted into the first stage MB0 of the memory buffer MB. The binary ONE condition of the status then indicates that this input line is now active.

In other words, a binary ZERO status bit is entered each time the sampled input line is found to be inactive, and the first time an input line is sampled after it becomes active, the status bit is changed to a binary ONE.

Still considering routine 38, the program counter PC is incremented by one (+1→PC) during $T_1$ time, thus developing the memory address of the instruction word for input line No. 2. During $T_2$ time, the status bit/sample count word for line No. 1 is returned to the memory location from which it came (MB→MEM), and the memory buffer is cleared (0→MB). The content of the program counter PC is transferred to the memory address register MA (PC→MA). Consequently, the memory is addressed to the location of the instruction word teletypewriter input line No. 2. The instruction register IR is cleared (0→IR), and the flip-flop F, which was cleared when the S flip-flop was set, is set to condition the F cycle (1→F).

The C cycle is thus skipped altogether. The system immediately increments the line register LR and repeats the above-noted operations, this time sampling input line No. 2.

Returning to the S cycle in FIGURE 2, if the status bit of the status bit/sample count word held in the memory buffer register MB is a binary ONE (MB0–1), the system departs from the above-described routine 38. Depending on the count registered by the sample count, this departure may merely constitute skipping the operation of shifting the memory buffer MB to shift in the complement of the line bit (ENTER $\overline{\text{LINE BIT}}$), thereby preserving the existing binary ONE status bit (MB0–1). On the other hand, the departure may be complete in that the system follows an entirely different routine, as indicated at 40.

The sample count portion of the status bit/sample count word is held in the last three stages MB9–MB11 of the memory buffer register MB, a 12-bit register MB0–MB11. These last three memory buffer stages are connected for optional operation as a binary counter having an eight-count capacity. This three-stage binary counter is incremented by one (+1→SC) each time it is sensed that the status bit is a binary ONE. The purpose of the sample count can be best understood from a consideration of FIGURE 4.

A series of clock interrupt pulses are shown in FIGURE 4*a*. FIGURE 4*b* shows part of a representative teletypewriter character as it would be received in serial bit fashion over a teletypewriter input line. Since the clock interrupt pulses occur at a rate equal to eight times the teletypewriter baud rate, eight clock interrupt pulses will occur during the pulse interval of each teletypewriter bit.

Assuming that the teletypewriter character represented in FIGURE 4*b* is being transmitted over teletypewriter input line No. 1, it is seen that the sampling of this line in response to the first three clock interrupt pulses in FIGURE 4*a* finds the line inactive. However, upon sampling input line No. 1 in response to the fourth clock interrupt pulse 42, it is found that a start bit, a binary ZERO, is being transmitted. As previously noted in connection with routine 38, the complement of this start bit, a ONE, is shifted into the first stage MB0 of the memory buffer MB during the S cycle when the status bit/sample count word is contained therein. The status bit becomes a binary ONE as indicated in FIGURE 4*c*.

When teletypewriter input line No. 1 is again sampled in response to the next clock interrupt pulse 43, the status bit/sample count word is again transferred from the memory into the memory buffer (MEM→MB) at the beginning of the S cycle. Since the status bit is now a binary ONE, the sample count portion of the word contained in the memory buffer is incremented by one (+→SC), as indicated at 44 in FIGURE 2. The sample count progression is shown in FIGURE 4*d*.

Returning to FIGURE 2, if the sample count is not equal to three ($\overline{SC=3}$), the system proceeds through routine 38, except that the memory buffer regiser MB is not shifted. Thus, the status bit cannot be altered once it goes to a binary ONE. As will be seen, by not shifting the memory buffer after the status bit becomes a binary ONE, the sample count portion of the status bit/sample count word is preserved.

In the specific example being considered in connection with FIGURE 4, the status bit/sample count word returned to memory includes a binary ONE status bit and a sample count of ONE wherein the last bit is a binary ONE. The F flip-flop is set, thereby omitting the C cycle and the system proceeds to sample the next teletypewriter input lines in sequence.

Returning to FIGURE 4, in response to the next occurring clock interrupt pulse 45, the status bit/sample count word for input line No. 1 is again examined during an S cycle. The status bit is a binary ONE and the sample count is incremented to two as shown in FIGURE 4*d*. The status bit/sample count word is returned to memory and the system proceeds to sample input line No. 2 again without going through a C cycle with respect to input line No. 1.

When teletypewriter input line No. 1 is again sampled in response to interrupt pulse 46, the sample count is incremented to a count of three. The system once again skips the C cycle and goes directly into the F cycle incident to sampling input line No. 2. There, in response to the next occurring clock interrupt pulse 47, the status bit/sample count word for input line No. 1 is again examined during $T_0$ time of the S cycle.

Returning to FIGURE 2, since the sample count equaled three before being incremented, routine 40, rather than routine 38, is followed. Accordingly, the status bit/sample count word is returned to memory and the memory buffer cleared during $T_2$ time. The sample count portion of the status bit/sample count word for input line No. 1 is now a four.

Also the content of the program counter is transferred to the memory address register (PC→MA). It is to be noted that this time the program counter was not previously incremented during the S cycle and, as a consequence, the address transferred into the memory address register is that of the character assembly word for input line No. 1. The program counter is now incremented (+1→PC) to develop the memory address location for the instruction word of the input line No. 2, next to be sampled. The final operation of routine 40 is to set a flip-flop C (1→C) which conditions the C cycle.

In accordance with the routine of the C cycle as seen in FIGURE 2, the memory is strobed and the character assembly word is read from the memory into the memory buffer during $T_0$ time. During $T_1$ time, the memory buffer is shifted right one place, and the line bit, a binary ZERO start bit, being transmitted over input line No. 1, is shifted into the first stage MB0 of the memory buffer. This is shown in FIGURE 4*c*.

It will be seen that by delaying the use of the C cycle until the sample count reaches three, which corresponds to the fourth cycle during which the start bit persisted on input line No. 1, the line bit is shifted into the memory buffer and assembled as a part of the character assembly word at a time approximating the mid-point of the start bit pulse interval.

It is seen in FIGURE 2 that after the line bit has been entered into the memory buffer, the character assembly word is returned to the same memory location it previously occupied, and the memory buffer is cleared during $T_2$ time of the C cycle. The content of the program counter is transferred to the memory address register (PC→MA). Consequently, the memory MEM is addressed to the location of the instruction word for the next input line, line No. 2, to be sampled in sequence. The instruction register IR is cleared (0→IR), and the F flip-flop is set to condition the F cycle incident to sampling input line No. 2.

Still considering the specific example illustrated in FIGURE 4, when input line No. 1 is again sampled in response to the next occurring clock interrupt pulse, the system goes through the F and S cycles, but skips the C cycle, inasmuch as the sample count is not equal to three, before incremented. With ensuing samplings of input line No. 1, the sample count will reach seven, return to zero, and begin counting to eight again. When the sample counter for input line No. 1 again registers three before incrementing, a C cycle is once more conditioned. Consequently, the teletype character bit transmitted after the start bit, a binary ONE in the illustrated example, is entered into the first stage MB0 of the memory buffer for assembly into the character assembly word at the same time as the start bit is shifted to the next stage MB1 (SHIFT MB).

In other words, the sample counter recycles through a three count with every eighth clock interrupt pulse. Since the teletypewriter bit pulse interval of a transmitted Teletype character is uniform throughout, the sample count recycles through a three count close to the mid-point of each character bit pulse interval. Thus, by keying on the mid-point of the start bit pulse interval and assembling the character bits of the transmitted character at times corresponding to every eight ensuing clock interrupt pulse, each line bit is assembled into the character assembly word at the most optimum time during its respective pulse intervals, that is, at a time when an error in ascertaining the bit is least likely.

When a full teletypewriter character has been received over an input line and the corresponding character assembly word is thus filled, the system transfers the assembled teletypewriter character to another memory location assigned to the input line. This operation, which in the present case is governed by the computer programmer using the more conventional portions of the computer, is carried out during an interval between sampling sequences. The associated status bit/sample count word is erased, and the system is prepared to assemble the next teletypewriter character arriving over this input line. The programmer can determine when an entire character has been received by observing when the start bit enters a certain stage in the assembly word.

When a complete message consisting of a plurality of teletypewriter characters has been assembled, the system may transfer this message at a rapid rate to the central station during an interval between sampling sequences, again under the control of a suitable program. Referring to FIGURE 1, this operation is carried out by successively transferring the characters of an assembled message from the core memory MEM to the accumulator AC by way of the memory buffer MB and connection 50. The characters are transmitted, preferably in parallel, from the accumulator AC to the central station over the communication link 28.

Also during intervals between sampling sequences, the system can transmit teletypewriter data originating at the central station back to designated ones of the teletypewriter stations over output teletypewriter lines 22. This teletypewriter data is transferred from the central station into the core memory MEM by way of the communication link 28, the accumulator AC, connection 50, and the memory buffer register MB. The data is stored in the core memory at predetermined locations specifically assigned to the indivdual teletypewriter stations to which the data is to be transmitted.

Returning now to FIGURE 2, the system is programmed to transfer to the line register LR (by way of the memory buffer, accumulator AC, and a connection 52) a line number stored in the memory MEM. This line number is decoded in the line register LR with the result that the output flip-flop connected to the teletypewriter station designated by the line number is conditioned over connection 25. The next programmed operation is to transfer, from the memory MEM to the accumulator AC, the teletypewriter character to be transmitted. All of this is accomplished with conventional programming techniques implemented by computer logic circuitry 12. While the teletypewriter character is held in the accumulator, an F cycle (FIGURE 2) is initiated with the memory addressed for an appropriate instruction word. The instruction word is transferred from the memory MEM to the memory buffer MB during time $T_0$. This instruction word is decoded in the interface logic 14. The instruction register is conditioned to indicate a teletypewriter mode, while the interface logic generates a teletypewriter output command TTO. The teletypewriter output command causes the system to follow an output routine, generally indicated at 53 in FIGURE 2.

Specifically, the link L operating in conjunction with the accumulator AC is cleared during $T_1$ time of the F cycle. During $T_2$ time, the accumulator is shifted right one place causing the first bit of the teletypewriter character to be shifted from the right end stage of the accumulator (AC 11) into the output flip-flop 24 for the selected output line 22. The output driver 16 connected to this line energizes the line according to the state of the flip-flop for transmission of the first bit over the selected output line 22 to the designated teletypewriter station (not shown).

As seen in FIGURE 2, the instruction word is returned to the memory (MB→MEM), and the memory buffer cleared (0→MB) during $T_2$ time of the output routine 53. The content of the program counter is transferred to the memory address register (PC→MA), addressing the memory for the next instruction. The instruction register is cleared (0→IR) and the F flip-flop is set, conditioning another F cycle. This next F cycle will presumably bring forth an instruction to return the remainder of the teletypewriter character held in the accumulator AC to the memory MEM, together with the line number held in the line register.

As noted above, the system does not operate to transmit teletypewriter bits on all of the teletypewriter output lines 22 during a single interval between sampling sequences. Rather, it is preferably programmed to select the teletypewriter output lines 22 in groups equal in number to the factor by which the clock interrupt pulse rate exceeds the teletypewriter baud rate. Thus, if the clock interrupt pulse rate is eight times the teletypewriter baud rate, the output lines 22 are divided into eight separate groups. During the interval between consecutive sampling sequences, only one group of output lines 22 is selected for transfer of character bits to the output flip-flops 24 associated therewith. The flip-flops 24 in each group are selected for the transfer of character bits thereto in sequence. Any one teletypewriter output line 22 therefore is selected for retransmission during every eighth interval between sampling sequences. During the period between such intervals, the bit held in the output flip-flop 24 associated with the line is transmitted over the line.

Thus, in the example, the baud rate of the transmitted data is one-eighth the sampling rate. In other words, the teletypewriter data may thus be transmitted back to the individual teletypewriter stations at the same baud rate the teletypewriter stations use in transmitting data to the system over input lines 18. It is understood that if no data is to be transmitted over a particular output line 22, it is preferably passed over in the selection sequence.

FIGURES 3*a*–3*g* illustrate the various logic circuits necessary to the operation of the present invention which are typically not present in the logic circuitry of a suitable computer adapted for use in the present invention. These logic circuits are included in the interface logic 14 (FIGURE 1), which is an adjunct to the normal computer logic circuitry and operates in concert therewith in accordance with the programmed operation of the system.

As was described in connection with FIGURE 2, the execution of an F cycle by the system is conditioned by the setting of an F flip-flop. During an F cycle, an instruction word is transferred from the memory MEM to the memory buffer MB. This word is decoded in the circuit of FIGURE 3*a*. Typically, the various instructions used in the computer specifically described herein are only three binary bits along (MB0–MB2) which is sufficient to designate eight principal computer operations, such as add, multiply, in-out transfer (IOT), etc. The normal instruction words are held in the instruction register IR (FIGURE 1) which is a three bit register.

In order to accommodate the additional teletypewriter instructions, the fourth through eleventh bits of the 12-bit instruction words are used. Specifically, when a teletypewriter instruction is to be performed, the first three bits of the word contained in memory buffer MB are the instruction word for an in-out transfer, the fourth bit (stage MB3 of the memory buffer) is a binary ONE, while the fifth through ninth bits (stages MB4–MB8) are binary ZEROS. As seen in FIGURE 3*a*, the outputs of memory buffer stages MB3–MB8 are applied to a diode AND circuit 70 along with the "IOT" output of the instruction register IR. Another input to the AND circuit 70 is the "set" output of the F flip-flop. It is recalled that this condition of the F flip-flop indicates that the sytsem is in an instruction-fetching state.

When all of the inputs to the AND circuit 70 are true, the resulting output, applied through a two stage inverter network 72 to provide drive capability, constitutes a teletypewriter instruction signal TT. This signal indicates to the system that the teletypewriter data is handled, but it does not indicate whether the system is to sample the teletype input lines 18 for incoming data or to transmit data over the teletypewriter output lines 22 to the individual teletypewriter stations. The teletypewriter input TTI and teletypewriter output TTO commands are generated by the logic circuits of FIGURES 3*b* and 3*c*.

Referring first to FIGURE 3*b*, the teletypewriter instruction signal TT and the ONE output of the memory buffer stage MB10 are applied to an AND gate 74. If the eleventh bit of the instruction word (memory buffer stage MB10) is a binary ONE, AND gate 74 is enabled during $T_1$ time of the F cycle. Its output is inverted by an inverter 75 to become the teletypewriter input command TTI. Thus, with an instruction word held in the memory buffer MB, if stages MB3 and MB10 contain ONES and stages MB4–MB8 ZEROS, a teletypewriter input command TTI issues.

Referring to FIGURE 3*c*, the teletypewriter instruction signal TT and the ONE output from memory buffer stage MB9 are applied to an AND gate 76. If the memory buffer stage MB9 contains a ONE during the time that the teletypewriter instruction signal TT is generated, the AND gate 76 is enabled, and the resulting output, inverted in an inverter circuit 77, becomes the teletypewriter output command TTO.

Referring to FIGURES 2 and 3*c*, it is seen that the teletypewriter output command TTO is used to clear the link L (0→L). Output command TTO also enables an AND gate 78 to pass a $T_2$ pulse as a "rotate accumulator right" signal (RAR) by way of a pulse amplifier 79 and line 81 (FIGURE 1) to the accumulator AC. In response to the signal RAR, the teletypewriter character held in the accumulator is shifted to move the next character bit into an output flip-flop 24. This character bit is transferred over line 23 to the output driver circuitry 16 for transmission over one of the output lines 22 to the teletypewriter station selected by the line register LR, as previously described.

Returning to FIGURE 3*b*, the Teletype input command TTI enables an AND gate 83 to pass the next timing pulse $T_2$ and thereby set the S flip-flop. It will be recalled that the setting of the S flip-flop conditions the system to next execute an S cycle as depicted in FIGURE 2.

Considering the circuit of FIGURE 3*d*, the "set" outputs of the S and C flip-flops (FIGURE 3*b*) are applied to a diode OR gate 84. The output of OR gate 84 is fed through two inverter stages, commonly indicated at 85, to develop a signal enabling the transfer of the content of the program counter PC to the memory address register MA. This signal is applied to a gate (not shown) in the computer which passes $T_2$ pulses when the PC→MA transfer is to be made.

Referring to FIGURE 1, it is seen that this transfer enabling signal is supplied over a line 88 connected from the interface logic 14 to the memory address register MA. A similar transfer enabling signal is also developed by the computer logic 12 on line 88 during each F cycle.

The circuit of FIGURE 3*e* is used to generate the program counter increment signal (+1→PC) supplied over line 90 to the program counter PC (FIGURE 1). As seen from FIGURE 2, this signal is required during $T_1$ time of the S cycle except when the sample count of the status bit/sample count word held in the memory buffer MB equals three prior to being incremented. It is recalled that incrementing the program counter at this time changes the content of the program counter from the memory address of the character assembly word for the input line being sampled to the memory address of the instruction word for the next input line to be sampled. As described, the S cycle then concludes with the F flip-flop being set to effectively skip the C cycle and immediately condtion another F cycle incident to sampling the next input line in the sequence.

Accordingly, as seen in FIGURE 3*e*, the set output of the S flip-flop enables a diode AND gate 91 to pass a $T_1$ pulse through a pair of inverter stages, commonly indicated at 92, to provide a TIS pulse. This pulse is fed through a diode 93 and an inverter circuit 94 to provide a program counter increment signal (+1→PC), except when the latter signal is to be inhibited.

More specifically, the ZERO output of memory buffer stage MB9 and the ONE outputs of stages MB10 and MB11 are applied as separate inputs to a diode AND gate 95. It will be recalled that the memory buffer stages MB9–MB11 hold the sample count portion of the status bit/sample count word contained in the memory buffer MB during the S cycle. The output of the AND gate 95 is connected through an inverter circuit 96 to the cathode of the diode 93. When the three inputs to the diode AND gate 95 are true, indicating a sample count of 3, the resulting output of the AND gate is effective to block diode 93. As a result, the program counter increment signal (+1→PC) is not generated at the output of the inverter 94. Thus, the program counter is incremented during $T_1$ time of each S cycle except when the sample count equals 3.

Again it will be understood that in other instances the program counter is incremented by the computer logic circuitry 12 or interface logic 14 over line 90 (FIGURE 1).

The circuit shown in FIGURE 3*f* initiates the functions of incrementing the sample counter (+1→SC) and shifting the memory buffer. To increment the sample counter, the signal TIS (FIGURE 3*c*) is applied along with the ONE output of memory buffer stage MB0 to a diode AND gate 100. The output of the AND gate 100 is connected to an inverter 101 to thus provide the sample count increment pulse (+1→SC) during $T_1$ time of the S cycle when the status bit is a ONE (MB0–1). Recalling that a ONE status bit indicates that the input line being sampled is active, it is seen that the sample count is incremented each time an active line is sampled, as was described in connection with FIGURES 2 and 4.

Leaving FIGURE 3*f* for the moment to refer to FIGURE 3*g*, the disclosed logic circuit is used to enable the shifting of the memory buffer MB during the $T_1$ time of the S and C cycles. When a particular teletype input line 18 is selected by the line register LR for sampling, a binary ONE (line (1)), if there is one on the line, is passed through the line register to one input of a diode AND gate 110. If there is a ZERO on the line (line (0)) a corresponding signal is supplied as one input to a second diode AND gate 111. The other inputs to the AND gates 110 and 111 are provided by the "set" output of the S flip-flop (FIGURE 3*b*). The output of AND gate 110 is inverted in an inverter circuit 112 to provide a signal (0→MB0) effective to insert a binary ZERO into the first memory buffer stage MB0 when the memory buffer register MB is shifted right one place.

It will be recalled from the discussion of the S cycle in connection with FIGURE 2 that when an input line is inactive, it is clamped to a potential which is interpreted as a binary ONE. Thus, the AND gate 110 and inverter 112 insure that the status bit of the status bit/sample count word held in the memory buffer is written as a binary ZERO when the sampled line is inactive.

The output of diode AND gate 111, occurring when a binary ZERO bit is being transmitted over the sampled input line, is inverted in inverter circuit 114 to provide a signal (1→MB0) effective to insert a binary ONE into memory buffer stage MB0. Thus, the status bit indicates that the selected line is now active.

Still referring to FIGURE 3*g*, each line (0) signal on the sampled input line is applied to a diode AND gate 115. Each line (1) signal is applied to an AND gate 116. The "set" output of the C flip-flop is the other input to AND gates 115 and 116. The output of AND gate 115 is inverted in an inverter circuit 118 to also provide the signal (0→MB0). On the other hand, the output of the AND gate 116 is inverted in an inverter circuit 118 to also provide the signal (1→MB0). It will be recalled that during the C cycle a teletypewriter bit from the sampled teletypewriter line is entered into the memory buffer. Accordingly, an output from AND gate 115, occurring when the line bit is a binary ZERO, is effective to insert a binary ZERO into the first memory buffer stage MB0. On the other hand, an output from AND gate 116, occurring when the line bit is a binary ONE, inserts a binary ONE into memory buffer stage MB0.

Returning now to FIGURE 3*f*, the pulse TIS (FIGURE 3*e*) and the ZERO output of the first memory buffer stage MB0 are applied to a diode AND gate 122. The output from AND gate 122 is inverted in an inverter circuit 123 and amplified in a pulse amplifier 125 to provide a shift pulse (shift MB) effective to shift the memory buffer register right one place. This shift pulse is derived from the output of the AND gate 122 during $T_1$ time of the S cycle when the status bit of the status bit/sample count word is a binary ZERO, indicating that the input line being sampled was inactive when last sampled. This shift pulse in combination with either the signal (0→MB0) or the signal (1→MB0) derived in FIGURE 3*g* enters the appropriate status bit in the status bit/sample count word held in the memory buffer during $T_1$ time of the S cycle. If the sampled line continues to be inactive, the status bit is written as a binary ZERO. If the transmission of a start bit is detected, the status bit is written as a binary ONE.

Still referring to FIGURE 3*f*, the "set" output of the C flip-flop and the timing pulse $T_1$ are fed to a diode AND gate 130. The output of AND gate 130 is inverted in an inverter circuit 131 and the output of the inverter circuit 131 is connected in common with the output of inverter circuit 123. It is thus seen that AND gate 130 produces a memory buffer shift pulse during $T_1$ time of the C cycle. This shift pulse shifts the bits of the character already contained in the memory buffer to make way for the new bit supplied by the (0→MB0) or (1→MB0) signal derived in FIGURE 3*g*.

Returning now to FIGURE 3*b*, the "set" output of the S flip-flop together with the ONE output of memory buffer stage MB9, the ZERO output of memory buffer stage MB10 and the ZERO output of memory buffer stage MB11 are connected as inputs to a diode AND gate 134. The output of AND gate 134 is inverted in an inverter circuit 135 to provide an enabling signal for a gate 136. The gate 136 passes the timing pulse $T_2$ to set the C flip-flop. As noted above, memory buffer stages MB9–MB11 contain the sample count portion of the status bit/sample count word held in the memory buffer during the S cycle. It will also be recalled that if the sample count is equal to 4, it is time to go to the C cycle in order to transfer the character assembly word into the memory buffer and enter the line bit transmitted on the sampled input line. The output of AND gate 134 in FIGURE 3*b* enables AND gate 136 during the S cycle when the sample count is equal to 4 after being incremented, i.e. when there is a ONE in memory buffer stage MB9 and ZEROS in stages MB10 and MB11.

By way of summary, the present invention provides a system for efficiently handling data transmissions to and from a plurality of individual data stations. In the disclosed embodiment of the invention, the individual data stations take the form of teletypewriter stations operating to transmit teletypewriter data to the system over transmission lines 18 and to receive teletypewriter transmissions from the system over transmission lines 22. The system operates in response to a clock interrupt pulse generated by the clocks 30 to sample each of the input lines 18 in sequence for the presence of teletypewriter bits. The time required for the system to complete a sampling sequence is significantly less than the pulse interval of a character bit transmitted over the teletypewriter input lines 18. For example, in the disclosed embodiment, eight sampling sequences are carried out in the interval of a single character bit as transmitted over an input line. Thus, no teletypewriter data is lost even though the character transmissions from the individual teletypewriter stations occur randomly.

Each input line 18 is assigned three consecutive storage locations in the core memory MEM. The first memory location for a particular input line contains a teletypewriter input instruction word which is transferred from the memory into the memory buffer MB during the F cycle. This instruction word, upon being decoded in the interface logic 14, results in the generation of a teletypewriter input command TTI. In accordance with this command, the line register LR is indexed to effectively connect the associated input line to the input of the first memory buffer stage MB0. The memory is addressed to the next consecutive memory location, which contains a status bit/sample count word associated with the input line being sampled. This word is transferred into the memory buffer during the S cycle.

In the S cycle, if the status bit is a ZERO, indicating that this input line was inactive when last sampled, the memory buffer is shifted right one place, and the complement of the signal condition on the sampled input line is entered into the first memory buffer stage. If the input line is still inactive, the status bit is rewritten with a binary ZERO. On the other hand, if a character start bit is now being transmitted on this input line, the status bit is rewritten as a binary ONE.

The program counter is then indexed with the result that the next consecutive memory location, containing the character assembly word for the sampled input line, is skipped. The system proceeds to the sampling of the next input line 18 in sequence, whereupon the associated instruction word is transferred from the memory into the memory buffer during an F cycle, thereby initiating another C cycle.

If, during a C cycle, the status bit is found to be a binary ONE, indicating that the associated input line was active when last sampled, the memory buffer is no longer shifted. Instead, the sample count portion of the status bit/sample count word is incremented by one. Thus, the sample count registers the number of times an active input line is sampled during the transmission of a teletypewriter bit.

In the disclosed embodiment of the invention, the sample count recycles through a count of eight, which corresponds to the factor by which the sampling sequence rate exceeds the teletypewriter baud rate. When a character start bit has been on a particular input line for the fourth time, the C cycle is initiated for transfer of the associated character assembly word from the memory into the memory buffer. While the character assembly word is held in the memory buffer, the character start bit is shifted into the first memory buffer stage MB0. The character assembly word is returned to the memory and the system proceeds to sample the next input line in sequence.

During ensuing sampling of the same input line, the sample count portion of the status bit/sample count word is always incremented. Each time it is incremented from three to four during an S cycle, a C cycle is conditioned. The character assembly word is entered into the memory buffer, and the line bit is shifted into the first memory buffer stage MB0, while at the same time previously received bits are shifted to the right to make room for the new bit. It is seen that the system keys on the mid-point of the character start bit pulse interval, and the ensuing character bits are assembled into the character assembly word with every eighth sampling sequence thereafter. Each character bit is thus assembled into the character assembly word at a time closely approximating the midpoint of its pulse interval.

When a complete character transmitted over a particular input line has been assembled into the character assembly word, it can be transferred to a new memory location assigned to the input line over which it was received. The system is thus ready to receive the next character transmitted over this input line. When a full message consisting of a plurality of characters has been assembled, it can be transferred to a central station, such as a large computer, over the communications link 28. Also, the central station can transmit teletypewriter messages to the system for storage in the memory until they are transmitted to designated ONES of the individual teletypewriter stations over output lines 22.

These latter operations are carried out during the intervals between sampling sequences. As described, a computer such as Digital Equipment Corporation's PDP–8 digital computer can be conveniently used to carry out the present invention.

These computers operate with such speed that the F, S, and C cycles incident to the sampling of one input line may be performed in as little as 4.5 microseconds. It is understood that the C cycle, during which a transmitted character bit is assembled into the character assembly word, is not always carried out. Thus, an input line can be sampled in typically less than 4.5 microseconds. Assuming 128 input lines 18, a full sampling sequence would require less than 600 microseconds. If the teletypewriter stations transmit characters at a rate of 50 character bit pulses per second (50 baud) and the clock interrupt pulse rate is eight times this baud rate, it is seen that the interval between clock interrupt pulses is 2,500 microseconds. The time required for a single full sampling sequence is thus less than one-quarter of the time interval between clock interrupt pulses.

It is therefore apparent that a significant amount of time is provided between sampling sequences for the system to perform the other functions, such as assembling messages transmitted from the individual teletypewriter stations, transmitting assembled messages to the central station, receiving messages transmitted from the central station, and transmitting messages to the individual teletypewriter stations over output lines 22. In fact, there may be sufficient time left over to permit the computer to perform other operations wholly unrelated to the invention.

It will be understood, of course, that the system can be arranged to store the Teletype input instruction (or input instruction) in a single memory location and then "lock" onto that instruction until all of the lines have been sampled. This would result in a saving of almost one third of the memory adddesses assigned to the teletype input operation in the system specifically described above. Also, the status bit/sample count word and the character assembly word can both be stored in the same memory address if the word length of the memory is great enough and the memory buffer register is arranged so that separate portions thereof can be selectively shifted.

Reviewing the system operation to transmit messages back to the teletypewriter stations over output lines 22, a line number is transferred from the memory MEM to the line register LR. This line number if used to condition an output driver 16 for selection of the output line 22 connected to the teletypewriter station designated to receive the transmission. The character to be transmitted is then transferred from the memory to the accumulator AC. An instruction word is read from the memory into the memory buffer and decoded in the interfact logic 14 to develop a teletypewriter output command TTO. In response to this command, the next character bit to be transmitted in shifted from the accumulator into an output flip-flop 24, from which it is transmitted over the selected output line 22. The remainder of the character in the accumulator is then returned to the memory.

According to the invention, the output lines 22 are preferably divided into groups equal in number to the factor by which the clock interrupt pulse rate exceeds the teletypewriter baud rate. Only one group of output lines is selected during each interval between sampling sequences. Thus, with the foregoing arrangement, any one output line is selected during every eighth interval between sampling sequences. Since only one character bit is transmitted over a particular output line at any one time, it is seen that the rate of transmission over the output lines 22 may be precisely the same as the baud rate on the input lines 18.

While the foregoing description has dealt specifically with a single group of teletypewriter lines, operating at a single baud rate, it should be understood that the system can also accommodate groups of lines operating at different baud rates. In that case there will be a separate clock, such as clocks 30' and 30'' shown in FIGURE 1, for each group, emitting interruption signals according to the baud rate of that group. In response to each interruption signal, the system will jump to the memory block reserved for the corresponding group of lines and index the line register LR to the number of the first line to be sampled in the group. Operation will then proceed as described above for a single group arrangement.

In a multiple group arrangement the clocks are preferably synchronized and they preferably operate at harmonically related rates. Otherwise, interruption signals from two or more clocks may occur at about the same time, with the result that a sampling cycle for one or more groups will have to be skipped now and then.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and desired to secure by Letters Patent is:

1. A system for assembling character bits of data characters randomly transmitted in serial bit format over plural input lines, said system comprising, in combination:

(A) a clock periodically generating clock pulses, the interval between said clock pulses being substantially less than the duration of a character signal bit transmitted over an input line;

(B) means responsive to each said clock pulse to sample each of the input lines in sequence for incoming character bits;

(C) a memory storing
  (1) a character assembly word associated with each input line, and
  (2) a count word associated with each input line for timing a character transmission thereover;

(D) a register;

(E) means operating in conjunction with said sampling means and responding to said count words in corresponding sequence so as to transfer associated character assembly words from said memory into said register at selected times during character transmission over associated input lines; and (F) assembly means operating in conjunction with said sampling means to
  (1) connect said register to receive from the input line associated with the character assembly word contained therein the bit on said line and thereby assemble said bit into said character assembly word, one character bit being assembled at each said selected time, and
  (2) return said character assembly word to said memory for storage during the intervals between said selected times.

2. The system defined in claim 1 wherein (A) said register is operated by said assembly means as a shiftable register,
  (1) said register being shifted once to enter each character bit for appropriate assembly into the character assembly word contained in said register.

3. A system for assembling character bits of data characters randomly transmitted in serial bit format over plural input lines, said system comprising, in combination:

(A) a clock periodically generating clock pulses, the interval between said clock pulses being substantially less than the signal duration of a transmitted character bit;

(B) a register;

(C) means responsive to each clock pulse to select the input lines in sequence for momentary connection to an input of said register;

(D) a memory storing
  (1) a character assembly word associated with each input line, and
  (2) a count word associated with each input line for timing a character transmission;

(E) means responsive to the presence of a character bit on a selected input line to increment the count word associated therewith;

(F) assembly means responsive to the count word associated with each selected input line so as to transfer the character assembly word associated with said selected input line from said memory into said register only at selected times during a character transmission;

(G) means conditioned by said last assembly means to shift said register, thereby entering the character bit transmitted over said selected line into said register for assembly in said character assembly word; and (H) means for returning said character assembly word to said memory for storage prior to the selection of the next input line in sequence.

4. The system defined in claim 3

(A) wherein said count word and said character assembly word associated with each input line have separate storage locations in said memory; and (B) including means operating in conjunction with said selecting means to condition the transfer from said memory to said register of the count word associated with each selected input line,
  (1) said count word being incremented while held in said register and immediately returned to said memory to clear said register for the transfer thereto of the character assembly word associated with said selected input line when the count word has a given predetermined value.

5. A system for assembling bits of data characters randomly transmitted in serial bit format over plural input lines, said system comprising, in combination:

(A) a memory storing
  (1) a character assembly word associated with each input line, and
  (2) an indicator word associated with each input line and having a count portion timing a character transmission over its associated input line;
(B) a register;
(C) switching means operating to select said input lines for momentary connection to an input of said register in repeating sequence;
(D) second means operating in synchronism with said switching means to transfer to said register the indicator word associated with said selected input line;
(E) third means responsive to the count portion of said indicator word in said register;
(F) fourth means operating to return the indicator word to said memory and conditioned by said third means to transfer the character assembly word from said memory into said register at selected times during a character transmission over said selected input line; and
(G) assembly means conditioned by said fourth means to enter the character bit being transmitted on said selected input line into said register for assembly into said character assembly word,
(1) said fourth means returning said character assembly word to said memory prior to the selection of the next input line in sequence by said switching means.

6. The system defined in claim 5
(A) wherein each said indicator word includes a status bit having a first value during the time of a character transmission over the input line associated therewith;
(B) including sixth means operable when the status bit of the indicator word in said register is of said first value to increment the count portion thereof; and
(C) wherein said third means conditions said fourth means whenever the count portion achieves a predetermined count.

7. A system for assembling bits of data characters randomly transmitted in serial bit format over a group of input lines, said system comprising, in combination:
(A) a clock periodically generating clock pulses, the interval between said clock pulses being substantially less than the duration of a character bit transmitted over an input line;
(B) a register;
(C) means responsive to each said clock pulse to select all the input lines in said group in sequence for momentary connection as inputs of said register;
(D) a memory storing
(1) a character assembly word associated with each input line, and
(2) an indicator word associated with each input line for timing a character transmission;
(E) means transferring the indicator word associated with each selected line from said memory into said register;

(F) means responsive to said indicator word while held in said register for transferring the character assembly word associated with said selected input line into said register at selected times during character transmission,
(1) said selected times being determined by said indicator word; and
(G) means entering the character bit being transmitted over a selected line into said register for assembly into said associated character assembly word.

8. The system defined in claim 7
(A) which further includes means responsive to a character transmission over a selected input line to augment the associated indicator word each time it is held in said register, and
(B) wherein said indicator words thereby define uniform time intervals during a character transmission over each said selected line.

9. A system for assembling character bits of data characters randomly transmitted in serial bit format over plural input lines, said system comprising, in combination:
(A) a clock periodically generating clock pulses, the interval between said clock pulses being substantially less than the duration of a character bit transmitted over an input line;
(B) a register;
(C) means responsive to each said clock pulse to select the input lines in sequence for momentary connection to an input of said register;
(D) a memory storing in separate locations
(1) a character assembly word associated with each input line, and
(2) an indicator word associated with each input line for timing a character transmission;
(E) means responsive to said indicator word for each selected input line for transferring the associated character assembly word into said register from said memory at selected times during character transmission over said input line,
(1) said selected times being determined by said indicator word; and
(F) means for entering the character bit being transmitted over a selected input line into said register for assembly into said associated character assembly word.

References Cited

UNITED STATES PATENTS

| | | | |
|---|---|---|---|
| 3,202,972 | 8/1965 | Stafford et al. | 340—172.5 |
| 3,341,817 | 9/1967 | Smeltzes | 340—172.5 |

PAUL J. HENON, *Primary Examiner.*

P. WOODS, *Assistant Examiner.*

UNITED STATES PATENT OFFICE
CERTIFICATE OF CORRECTION

Patent No. 3,416,141 December 10, 1968

Edson D. de Castro

It is certified that error appears in the above identified patent and that said Letters Patent are hereby corrected as shown below:

Column 8, line 47, "(+→SC)" should read -- (+1→SC) --. Column 12, lines 9 and 46, Column 16, lines 54 and 58, "teletype" each occurrence, should read -- teletypewriter --. Column 16, line 54, "(or input)" should read -- (or output) --; line 68, "if" should read -- is --; line 74, "interfact" should read -- interface --.

Signed and sealed this 24th day of November 1970.

(SEAL)
Attest:

Edward M. Fletcher, Jr.
Attesting Officer

WILLIAM E. SCHUYLER, JR.
Commissioner of Patents